Figure 1:
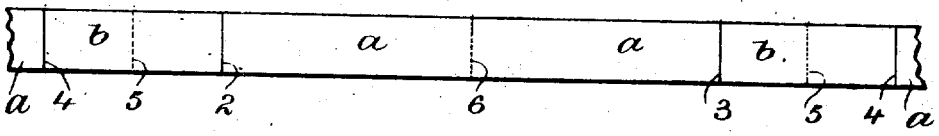

S. KOPS.

ELASTIC WEBBING.

APPLICATION FILED DEC. 9, 1908.

Reissued May 25, 1909.

12,962.

Witnesses

Chas. H. Smith

A. L. Serrell

Inventor

Samuel Kops.

by Harold Serrell his atty.

UNITED STATES PATENT OFFICE.

SAMUEL KOPS, OF NEW YORK, N. Y., ASSIGNOR TO KOPS BROS., OF NEW YORK, N. Y., A FIRM.

ELASTIC WEBBING.

No. 12,962. Specification of Reissued Letters Patent. Reissued May 25, 1909.

Original No. 875,439, dated December 31, 1907, Serial No. 376,087. Application for reissue filed December 9, 1908. Serial No. 466,728.

*To all whom it may concern:*

Be it known that I, SAMUEL KOPS, a citizen of the United States, residing at the borough of Manhattan, city, county, and State of New York, have invented an Improvement in Elastic Webbing, of which the following is a specification.

My invention relates to a new and useful form of elastic webbing adapted for most if not all uses for which elastic webbing is employed in the arts and manufactures, especially for articles of apparel and body wear including undergarments and supporting devices therefor, and particularly hose supporters; the object of my invention being to obviate the disintegration, separation and distortion of the elastic webbing so common as the result of use and wear at the places of attachment thereof to articles of apparel or supporting fastening devices by the lines of sewing.

In the manufacture of elastic webbing as heretofore practiced, the webbing is woven under tension at the maximum elastic limit of the webbing, that is, with the elastic strands stretched, with the warp threads taut and the weft thredas separated. Consequently the limit of contraction after release brings the weft threads close together with the warp threads loose but does not return the elastic parts or strands to their normal proportions; therefore the elastic strands are gripped in the channels in the woven threads and cannot return to normal proportions.

In the use of this elastic webbing and in connecting the same for use to articles of apparel, the elastic strands are often cut in sewing the webbing to place and they pull through the channels in the fabric, and as soon as this condition obtains, disintegration, separation and distortion of the elastic webbing ensues and the webbing becomes substantially useless.

With particular reference to elastic webbing for hose supporters, the present custom is to attach the webbing of ordinary character to corsets or corset-waists, or sell them separate to be so attached to corsets or corset-waists, or other articles of wearing apparel forming an anchorage for the holding tension applied to the supporter in use. Sewing this elastic webbing to such garments or corsets is also liable to cut the elastic strands and weaken the webbing and the same gradually becomes non-elastic adjacent to the point of attachment because the elastic strands more or less severed soon completely sever and pull through the channels in the fabric and it often occurs that the elastic webbing becomes worn out and useless long before the corset or other article of apparel is worn out or is ready to be cast aside.

The elastic webbing of my invention consists of a strip of woven section in part consisting of the ordinary woven elastic webbing woven under tension and a part at one end woven under normal conditions without tension so as to be substantially non-elastic and unyielding, and by this device the disadvantages inherent in the present style of elastic webbing are overcome.

In carrying out my invention, I weave the desired amount of elastic webbing as usual under tension at the maximum elastic limit of the webbing in which the elastic strands are under tension and the warp threads are drawn taut and the weft threads extending across the warp threads slightly separate. I then release the tension and proceed with the weaving of a predetermined length of the webbing under normal conditions without any tension of the elastic strands, with the warp threads taut and with the weft threads laid close and snugly together. The weaving under tension is performed with the elastic strands at a small cross sectional area consequently when tension is released the elastic strands increase in area, drawing the woven fabric together, but even then the elastic strands are not up to their maximum cross sectional area, while at the place of weaving under normal conditions and without tension the elastic strands are of normal cross sections and the weaving close together, snugly holding, or in other words, substantially pinching the elastic strands. It is therefore apparent that at the line or place where the weaving under tension stops and the weaving under normal conditions begins, the increased cross sectional area of the elastic strands will prevent them pulling into the channels of the first aforesaid portion under the tension of use; therefore the useful life of the elastic webbing is increased.

The portion woven under normal conditions and without tension is the part sewed to or into the garment, corset or article of wearing apparel and it is my intention to leave a part of this weaving outside of the line of sewing, hence the sewing of the elastic webbing to its support does not injure the elastic strands to which tension is applied or their anchorage or impair the function they perform. These elastic and non-elastic portions may be woven as a continuous strip or length in alternate sections and the alternate sections may be of any desired useful length, and I prefer to so weave them in alternate lengths that the sections of elastic and non-elastic weaving may be cut up as desired and preferably centrally at each section, so that each section as cut up shall contain an elastic and a non-elastic part.

Figure 2:
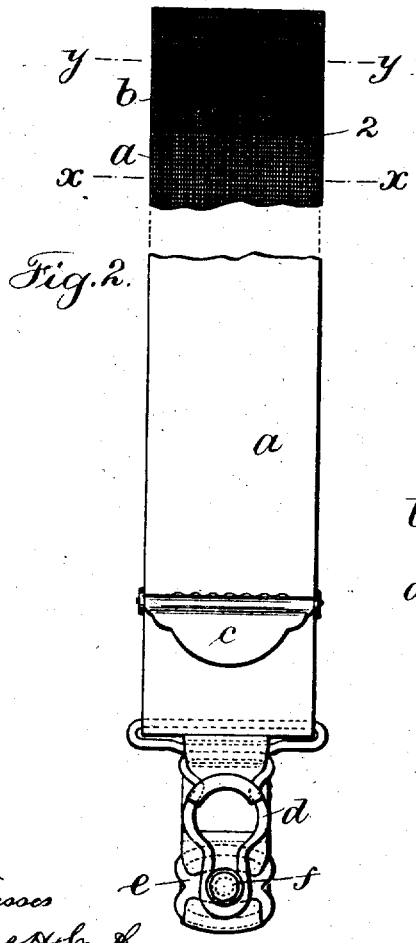
Figure 4:
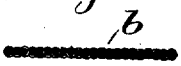
Figure 3:
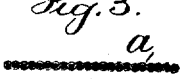
Figure 5:
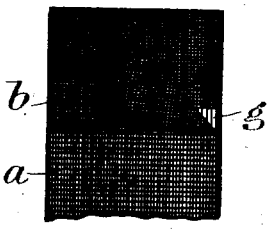
Figure 6:
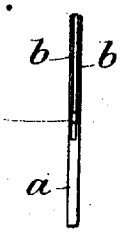

In the drawing, Figure 1 represents a length of the elastic webbing woven according to my invention. Fig. 2 represents by a broken plan a hose supporter formed with my improved elastic webbing. Fig. 3 is a cross section at the dotted line *x*, *x*, of Fig. 2. Fig. 4 is a cross section at the dotted line *y*, *y*, of Fig. 2. Fig. 5 represents by a broken plan a modified form of my invention and Fig. 6 is an edge view of this modified form of webbing shown in Fig. 5. The part in Fig. 5 turned over being shown straight in Fig. 6.

As shown in Fig. 1, I prefer to weave my improved elastic webbing of a continuous strip or length in alternate sections; each alternate section *a* between the lines 2 and 3 being woven as usual under tension and substantially at the elastic limit of the completed webbing; the sections *b* between the lines 2 and 4 on one side and 3 and 4 on the other side being woven under normal conditions upon the entire release of tension, consequently the elastic strands in the sections *a* when tension is released will not return to their normal condition, but are gripped by the woven threads of the fabric and the weft threads of the weaving are not as close together as are the weft threads in the sections *b*. The sections *b* are woven under normal conditions without any tension of the elastic threads, consequently the weft threads of the weaving are close together and the elastic strands of the webbing are of full size and are held tightly in the weave, or in other words, slightly pinched by the same; there being an appreciable difference in the cross sectional area between the elastic strands in the sections *b* and the elastic strands in the sections *a*.

I have shown in Fig. 1, dotted lines 5 at the centers of the sections *b* of the continuously woven fabric which are woven without tension and dotted lines 6 at the central portions of the sections *a* woven under tension, and this continuous fabric shown in Fig. 1 is advantageously severed into lengths upon both or any of the dotted lines 5 or 6 according to the use to which said elastic and non-elastic sections are to be put. Where they are to be used for hose supporters and attached to articles of wearing apparel, it is preferable to sever the continuous fabric into lengths for such use upon both the dotted lines 5 at the center of the sections *b* and the dotted lines 6 at the center of the sections *a* so that each piece as thus severed or cut up contains a non-elastic and an elastic section. The parts of the sections *b* because of their non-elastic character therefore become the parts which are sewed to or into the corset or other article of apparel for connection therewith, and the sections *a* of predetermined length and which are preferably cut at the center are woven of sufficient length to form the depending portions of two hose supporters and each part of sufficient length to have attached to its free end a device for connecting the same to the hose or other article of apparel to be supported.

In the enlarged view Fig. 2 I have shown a clamp *c*, a loop member *d*, a plate *e* and a stud *f* which are employed as usual to complete the hose supporter or securing device and form a means to engage with and grip the hose.

In Fig. 3, the section at *x*, *x*, is illustrative of the area of the elastic strands woven under tension and Fig. 4 illustrative of the area of the elastic strands woven without tension, or in other words, under normal conditions and normal proportions.

From the foregoing, it will be manifest that when this form of elastic webbing is employed as a supporter or for any other purpose and the same is connected to an article of apparel, or to a corset at the end woven under normal conditions, that the elastic strands cannot pull out or from the sections *b* into the sections *a*, not only because they are gripped and held but because the channels in the sections *b* are of larger area than the channels in the sections *a*; the elastic strands being thus anchored in the sections *b*. Therefore there will at all times be the desired elastic character of the webbing unless some of the elastic strands should break, which is not likely in view of the even distribution of the tension. It will also be apparent that as the elastic strands cannot, as has heretofore been common in elastic webbing, pull through the channels, that they must therefore remain in position, and furthermore, it will be apparent that because of the extent of the enlarged elastic strands that are held in the sections *b*, that there is sufficient of said strands gripped by the webbing under normal conditions as to form a safe, secure or permanent hold on the anchorage for these strands, so that their useful life will be increased and be given a permanent character.

In the form of my invention shown in Figs. 5 and 6, the short section of fabric woven normal and without tension instead of being made solid and in one position as shown in Figs. 1 to 4 inclusive and hereinbefore described, is made double or in two parts, each of which is woven firmly and of unyielding character; there being two members as shown in Figs. 5 and 6, which are arranged parallel to each other, each a complete woven fabric in itself, with the elastic strands *g* between the parts free and disconnected. In this form of my invention the elastic sections woven under tension and the sections woven under normal conditions without tension are prolongations or continuations the one of the other; the elastic strands between the parts woven without tension being free are of course of normal area, that is to say, of larger area than the same strands in the channels of the webbing in the adjacent section woven under tension, hence the free ends of these elastic strands when the adjacent section is under tension in use cannot because of their increased area pull into the channels of the fabric in this section but maintain their position. Consequently the tension is distributed even throughout the length of the elastic strands in the webbing and there is nothing to injure these strands or cause them to break with proper use. Furthermore, the solid fabric portions form a firm and substantial anchorage material to sew to or into an article of apparel or a corset and because of their solid character woven without tension they are not in any way injured by any tension that may be applied to the elastic webbing, as the part that is elastic and is woven under tension is capable of elongation in use below the point of attachment of the elastic webbing to its anchorage.

I claim as my invention:

1. An elastic webbing consisting of a flat strip formed of a section woven under tension and an adjacent section woven under normal conditions without tension.

2. An elastic webbing consisting of an elongated flat strip formed in part of a section woven under tension and a section at one end thereof woven under normal conditions without tension.

3. A length of elastic webbing comprising alternate sections of predetermined length woven under tension and alternate intermediate short sections woven continuously therewith under normal conditions without tension and the same adapted to be severed at intermediate points in the respective sections as desired.

4. A strip of elastic webbing having a maximum section woven under tension and a minimum section at one end of the aforesaid section woven under normal conditions without tension and in which latter the elastic strands are of normal area and the woven threads close together, said minimum section in contrast to the maximum section being of close woven and solid character.

5. A length of elastic webbing, comprising alternate sections of predetermined length loose woven or with spaced weft threads and adapted to yield under tension, and alternate intermediate short sections tight woven or with close weft threads, so as to be substantially non-elastic, said sections being woven continuous and the said length of webbing adapted to be severed at any or all intermediate points in the respective sections to form strips of the desired length.

6. An elastic webbing formed of a section woven under tension and a section at one end thereof woven under normal conditions without tension and said sections being a continuation the one of the other.

7. An elastic webbing consisting of a flat strip woven of indefinite length and formed of elastic and non-elastic parts in alternate series, the elastic parts being woven under tension and the non-elastic parts under normal conditions without tension, the elastic strands however running continuous through the strip and the strip being adapted to be cut up so as to obtain lengths in each of which there is one or more elastic or non-elastic parts.

8. A length of elastic webbing comprising alternate sections of predetermined length woven under tension and alternate intermediate sections woven continuously therewith under normal conditions without tension and the same adapted to be severed at any intermediate point in the respective sections as desired.

Signed by me this 14th day of October 1908.

SAMUEL KOPS.

Witnesses:
NORBERT VON KAAN,
JULIUS KOHLER.